United States Patent
Hirose

(10) Patent No.: US 10,170,973 B1
(45) Date of Patent: Jan. 1, 2019

(54) SYNCHRONOUS RECTIFIER CIRCUIT AND SWITCHING POWER SUPPLY APPARATUS

(71) Applicant: FUJITSU LIMITED, Kawasaki-shi, Kanagawa (JP)

(72) Inventor: Tatsuya Hirose, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/103,293

(22) Filed: Aug. 14, 2018

(30) Foreign Application Priority Data

Sep. 28, 2017 (JP) .................................. 2017-187954

(51) Int. Cl.
| | | |
|---|---|---|
| *H02M 1/00* | (2006.01) | |
| *H02M 1/08* | (2006.01) | |
| *H02M 7/217* | (2006.01) | |
| *H02M 1/14* | (2006.01) | |

(52) U.S. Cl.
CPC ............. *H02M 1/08* (2013.01); *H02M 7/217* (2013.01); *H02M 1/143* (2013.01); *H02M 2001/0054* (2013.01)

(58) Field of Classification Search
CPC ......... H02M 3/33576; H02M 3/33592; H02M 1/081; H02M 1/4208
See application file for complete search history.

(56) References Cited

U.S. PATENT DOCUMENTS

| 2016/0099658 A1* | 4/2016 | Ishimaru ............... H02M 7/219 310/68 D |
| 2017/0110959 A1 | 4/2017 | Ishimaru et al. |

FOREIGN PATENT DOCUMENTS

| JP | 2008-245387 A | 10/2008 |
| JP | 2010-130708 A | 6/2010 |
| JP | 2017-79527 A | 4/2017 |

* cited by examiner

*Primary Examiner* — Adolf Berhane
*Assistant Examiner* — Afework Demisse
(74) *Attorney, Agent, or Firm* — Arent Fox LLP

(57) ABSTRACT

A synchronous rectifier circuit used in a switching power supply apparatus that performs synchronous rectification includes a transistor and a secondary control IC. The transistor performs switching operation in accordance with a gate voltage applied to a gate terminal. The secondary control IC includes a terminal and applies the gate voltage to the gate terminal of the transistor. The terminal is connected to a capacitor which stores electric charge to be supplied to the gate terminal of the transistor. The terminal is applied with a direct-current voltage obtained through synchronous rectification. The direct-current voltage is equal to or smaller than a withstand voltage of the gate of the transistor, and equal to or larger than a threshold voltage of the transistor. A maximum value of the gate voltage is the direct-current voltage.

5 Claims, 9 Drawing Sheets

SYNCHRONOUS RECTIFIER CIRCUIT AND SWITCHING POWER SUPPLY APPARATUS

CROSS-REFERENCE TO RELATED APPLICATION

This application is based upon and claims the benefit of priority of the prior Japanese Patent Application No. 2017-187954, filed on Sep. 28, 2017, the entire contents of which are incorporated herein by reference.

FIELD

The embodiments discussed herein are related to a synchronous rectifier circuit and a switching power supply apparatus.

BACKGROUND

Switching power supply apparatuses are used as alternating current (AC)/direct current (DC) converters or DC/DC converters. Conventionally, there are isolated switching power supply apparatuses, each having a primary circuit and a secondary circuit. In an AC/DC converter, the primary circuit receives electric power from an AC power supply, and the secondary circuit outputs a DC voltage. The primary circuit and the secondary circuit are electrically isolated from each other, and magnetically coupled with each other by a transformer. Thus, in the isolated switching power supply apparatuses, when an electrical short circuit occurs in one of the primary and the secondary circuits, the influence of the short circuit is prevented from being exerted on the other. For example, even when an overvoltage occurs in the primary circuit when the primary circuit is struck by lightning, any device connected with the secondary circuit is protected.

In addition, there are synchronous rectifier circuits, each of which rectifies a voltage waveform produced across the secondary winding of a transformer. Specifically, each of the synchronous rectifier circuits uses a transistor (hereinafter referred to also as a switch) connected to the secondary winding, and turns on or off the switch at a timing determined in accordance with the voltage waveform. In a case where a rectifier circuit is constituted by a diode and a capacitor, the on-voltage of the diode and the current which flows through the diode will cause significant power loss, and thus limit the conversion efficiency of the converter, which includes the rectifier circuit. In the synchronous rectifier circuits, however, since the transistor has a low on-voltage, the power loss is reduced.

In recent years, dedicated control integrated circuits (ICs) are often used to accurately control the switch and improve the conversion efficiency. For example, the control ICs each operate with a power supply voltage, which is obtained by rectifying a voltage waveform across the secondary winding by using a diode, a resistor; and capacitor, and generates a control voltage (pulse wave) which is to be supplied to the switch. The maximum value of the control voltage is produced by an internal-voltage generation circuit of a corresponding control IC. Some of the control ICs have an external terminal which is connected to a capacitor. The capacitor is charged with the voltage generated by the internal-voltage generation circuit, to ensure a sufficient amount of current to drive the switch.

By the way, some new transistors have recently been developed, having a lower on-resistance and a lower switching loss, compared to the power silicon (Si)—metal-oxide-semiconductor field-effect transistor (MOSFET). The new transistors are, for example, FETs having a wide bandgap semiconductor. Examples of the FETs include a gallium nitride (GaN)—high electron mobility transistor (HEMT), and a MOSFET having silicon carbide (SiC). If such a transistor is used as the switch of the switching power supply apparatus, the conversion efficiency would be increased.

See, for example, Japanese Laid-open patent Publication Nos. 2010-130708, 2008-245387, and 2017-79527.

However, since the maximum value of the control voltage, which is supplied to the switch by a conventional control IC, is often set for the Si-MOSFET, the maximum value may exceed a withstand voltage of the gate terminal of the above-described transistor, which has a low on-resistance resistance and a low switching loss. For this reason, when the transistor (hereinafter referred to also as a low withstand-voltage-of-gate transistor) is used as the switch, some components, including a dedicated driver used to lower the control voltage, will be added. This disadvantageously increases the number of components.

SUMMARY

In one aspects of the embodiments, there is provided a synchronous rectifier circuit used in a switching power supply apparatus that performs synchronous rectification. The synchronous rectifier circuit includes: a transistor configured to perform switching operation in accordance with a control voltage applied to a first terminal; and a control circuit configured to include a second terminal and apply the control voltage to the first terminal. The second terminal is connected to a capacitor which stores electric charge to be supplied to the first terminal and is applied with a first direct-current voltage obtained through synchronous rectification and equal to or smaller than a withstand voltage of a gate of the transistor as well as equal to or larger than a threshold voltage of the transistor. A maximum value of the control voltage is the first direct-current voltage.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
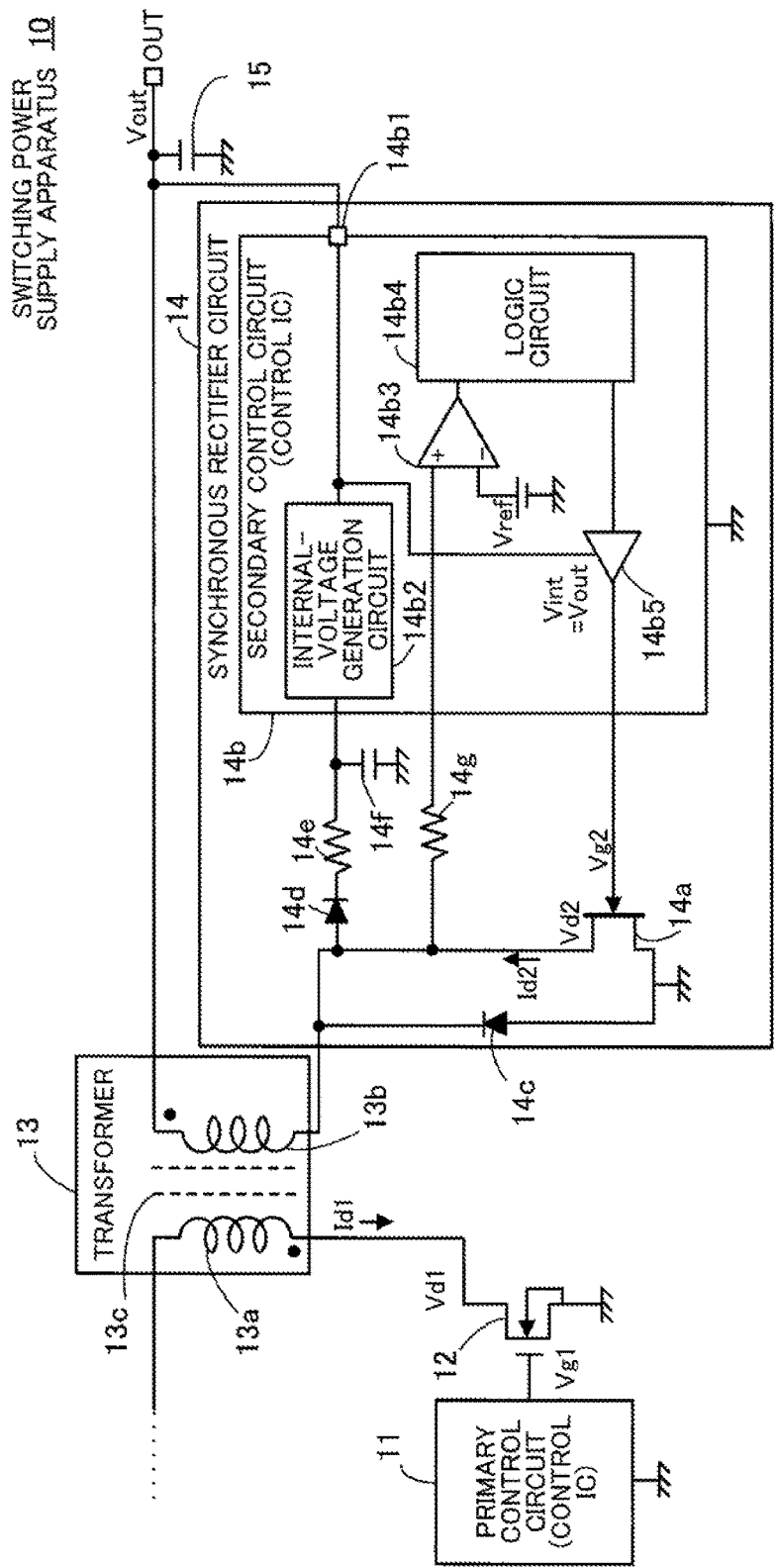
FIG. 1 illustrates one example of a switching power supply apparatus and a synchronous rectifier circuit of a first embodiment.

Hereinafter, some embodiments will be described with reference to the accompanying drawings, wherein like reference numerals refer to like elements throughout.

First Embodiment

FIG. 1 illustrates one example of a switching power supply apparatus and a synchronous rectifier circuit of a first embodiment.

An isolated switching power supply apparatus 10 which performs synchronous rectification is an AC/DC converter or a DC/DC converter.

The switching power supply apparatus 10 has a primary control circuit (hereinafter referred to as a primary control IC) 11 and a transistor 12. The primary control IC 11 is included in the primary circuit. In FIG. 1, components of the primary circuit of the switching power supply apparatus 10 other than the primary control IC 11 and the transistor 12 are omitted. In a case where the switching power supply apparatus 10 is an AC/DC converter, the primary circuit includes a rectification unit, which rectifies an alternate-current voltage.

The switching power supply apparatus 10 further includes a transformer 13, which electrically isolates the primary circuit and the secondary circuit from each other, and magnetically couples the primary circuit and the secondary circuit with each other. The secondary circuit includes a synchronous rectifier circuit 14 and a capacitor 15.

Hereinafter, the description will be made for a case where the transistor 12 is an n-channel FET. Examples of the FET include a Si-MOSFET, a GaN-HEMT, and an FET having SiC or gallium arsenide (GaAs).

The primary control IC 11 receives a power supply voltage (not illustrated), and outputs a control voltage (hereinafter referred to as a gate voltage Vg1) which turns on or off the transistor 12 at a predetermined frequency (hereinafter referred to as switching frequency) and duty ratio. The duty ratio is a ratio of an on-time of the transistor 12 to one cycle of time, and is changed by changing the pulse width of the gate voltage Vg1.

Alternatively, the primary control IC 11 may receive an error signal which indicates an error between an output voltage (direct-current voltage) from the switching power supply apparatus 10 and an expected value of the output voltage, and may adjust the duty ratio into an appropriate value, depending on the error signal.

In addition, the primary control IC 11 is connected to a terminal (hereinafter referred to as GND) having a reference potential (which is hereinafter 0 V, but is not limited to 0 V).

The transistor 12 has the drain terminal connected to a primary winding 13a of the transformer 13, the source terminal connected to GND, and the gate terminal connected to the primary control IC 11. The transistor 12 performs its switching operation in accordance with the gate voltage Vg1 supplied from the primary control IC 11.

The transformer 13 has the primary winding 13a, a secondary winding 13b, and a core 13c. Although schematically illustrated in FIG. 1, the primary winding 13a and the secondary winding 13b are wound around the core 13c. Here, a black dot illustrated in the vicinity of one end of the primary winding 13a indicates a position from the primary winding 13a is wound, and another black dot illustrated in the vicinity of one end of the secondary winding 13b indicates a position from which the secondary winding 13b is wound.

The other end of the primary winding 13a is connected to a rectification unit (not illustrated) which rectifies an alternate-current voltage, in a case where the switching power supply apparatus 10 is an AC/DC converter; or is connected to a DC power supply in a case where the switching power supply apparatus 10 is a DC/DC converter. The one end of the primary winding 13a is connected to the drain terminal of the transistor 12. The one end of the secondary winding 13b is connected to one end of the capacitor 15, and to an output terminal OUT of the switching power supply apparatus 10. The other end of the secondary winding 13b is connected to the synchronous rectifier circuit 14.

The synchronous rectifier circuit 14 includes a transistor 14a, secondary control circuit (hereinafter referred to as a secondary control IC) 14b, diodes 14c and 14d, resistance elements 14e and 14g, and a capacitor 14f. As is the transistor 12, the transistor 14a is an n-channel FET which is a low withstand-voltage-of-gate transistor, such as a GaN-HEMT or an FET having SiC or GaAs. For example, the withstand voltage of the gate of the transistor 14a (i.e. maximum allowable voltage between the gate and the source of the transistor 14a) is about 6 V.

The transistor 14a has the drain terminal connected to the secondary winding 13b, the source terminal connected to GND, and the gate terminal applied with a control voltage (hereinafter referred to as a gate voltage Vg2) supplied from the secondary control IC 14b. The transistor 14a performs its switching operation in accordance with the gate voltage Vg2.

The secondary control IC 14b includes a terminal 14b1. The terminal 14b1 is connected to the capacitor 15, which stores electric charge to be supplied to the gate terminal of the transistor 14a. The terminal 14b1 is applied with a voltage (direct-current voltage) Vint obtained through synchronous rectification. The secondary control IC 14b applies the gate voltage Vg2, which has a maximum value equal to the voltage Vint, to the gate terminal of the transistor 14a.

In FIG. 1, the terminal 14b1 is directly connected to the output terminal OUT of the switching power supply apparatus 10. Thus, the voltage Vint applied to the terminal 14b1 is equal to the output voltage Vout of the switching power supply apparatus 10.

The secondary control IC 14b further includes an internal-voltage generation circuit 14b2, a comparator 14b3, a logic circuit 14b4, and an amplifier 14b5.

The internal-voltage generation circuit 14b2 uses a voltage into which the diode 14d, the resistance element 14e, and the capacitor 14f has rectified the drain voltage Vd2 of the transistor 14a; and generates an internal voltage. Circuit parameters of the internal-voltage generation circuit 14b2 (including resistance values of a plurality of resistance elements of the internal-voltage generation circuit 14b2) are set so that the internal-voltage generation circuit 14b2 generates the internal voltage which exceeds the withstand voltage of the gate of the, transistor 14a, which is a low withstand-voltage-of-gate transistor. However, since the output terminal of the internal-voltage generation circuit 14b2 is connected to the output terminal OUT of the switching power supply apparatus 10 via the terminal 14b1, the voltage of the output terminal of the internal-voltage generation circuit 14b2 becomes the output voltage Vout of the switching power supply apparatus 10, regardless of the internal voltage the internal-voltage generation circuit 14b2.

The comparator 14b3 outputs a comparison result between the drain voltage Vd2 and a reference voltage Vref. One input terminal of the comparator 14b3 is connected to the drain terminal of the transistor 14a via the resistance element 14g, and the other input terminal of the comparator 14b3 is applied with the reference voltage Vref.

The logic circuit 14b4 determines whether to turn on or off the transistor 14a, depending on a comparison result outputted by the comparator 14b3. For example, when the drain voltage Vd2 is smaller than the predetermined reference voltage, the logic circuit 14b4 outputs a signal which instructs the amplifier 14b5 to turn on the transistor 14a.

The amplifier 14b5 produces the gate voltage Vg2, by amplifying the output signal from the logic circuit 14b4. The amplifier 14b5 is connected to the output terminal of the internal-voltage generation circuit 14b2 and the terminal 14b1. The maximum value of the gate voltage Vg2 is the voltage Vint applied to the terminal 14b1, that is, the output voltage Vout of the switching power supply apparatus 10.

The secondary control IC 14b is connected also to GND.

The diode 14c performs rectification until when the synchronous rectification is started by the switching operation of the transistor 14a. The anode of the diode 14c is connected to the source terminal of the transistor 14a, and the cathode of the diode 14c is connected to the drain terminal of the transistor 14a.

The diode 14d, the resistance element 14e, and the capacitor 14f produce a power supply voltage, which is a direct-current voltage to operate the secondary control IC 14b.

The anode of the diode 14d is connected to the secondary winding 13b, and the cathode of the diode 14d is connected to one end of the resistance element 14e. The other end of the resistance element 14e is connected to one end of the capacitor 14f, and to the internal-voltage generation circuit 14b2 of the secondary control IC 14b. The other end of the capacitor 14f is connected to GND.

The capacitor 15 of the switching power supply apparatus 10 is disposed to reduce ripple voltage. In addition, the capacitor 15 stores electric charge to be supplied to the gate terminal of the transistor 14a. One end of the capacitor 15 is connected to the secondary winding 13b, the output terminal OUT, and the terminal 14b1 of the secondary control IC 14b; and the other end of the capacitor 15 is connected to GND.

Hereinafter, the operation of the switching power supply apparatus 10 will be described.

When the gate voltage Vg1 outputted from the primary control IC 11 rises from a low (L) level to a high (H) level, the transistor 12 turns on, the drain current Id1 flows in a direction from the drain terminal to the source terminal, and the transformer 13 stores magnetic energy. When the gate voltage Vg1 falls from the H level to the L level, the transistor 12 turns off, and the drain current Id1 becomes 0 amperes (A). When the transistor 12 turns off, the magnetic energy stored in the transformer 13 causes the drain current Id2 to flow, via the diode 14c, in a direction from the drain terminal of the transistor 14a to the cathode of the diode 14c. In this time, the drain voltage Vd2 changes into a negative value. When the secondary control IC 14b detects this change, the secondary control IC 14b raises the gate voltage Vg2 from the L level to the H level. With this operation, the transistor 14a is turned on. At this time, the value of the H level is equal to the output voltage Vout.

When the magnetic energy stored in the transformer 13 decreases, the drain current Id2 also decreases, increasing the drain voltage Vd2. When the drain voltage Vd2 exceeds the reference voltage Vref, the secondary control IC 14b lowers the gate voltage Vg2 from the H level to the L level. With this operation, the transistor 14a is turned off. These operations are repeated; and the output voltage Vout, which is a direct-current voltage, is outputted from the output terminal OUT.

Hereinafter, one example the internal-voltage generation circuit 14b2 will be described. For comparison with. an operation. of the internal-voltage generation circuit 14b2 in a case where the terminal 14b1 is connected to the output terminal OUT, there will be described an operation of the internal-voltage generation circuit 14b2 in a case where the terminal 14b1 is not connected to the output terminal OUT.

Comparative Example

Figure 2:
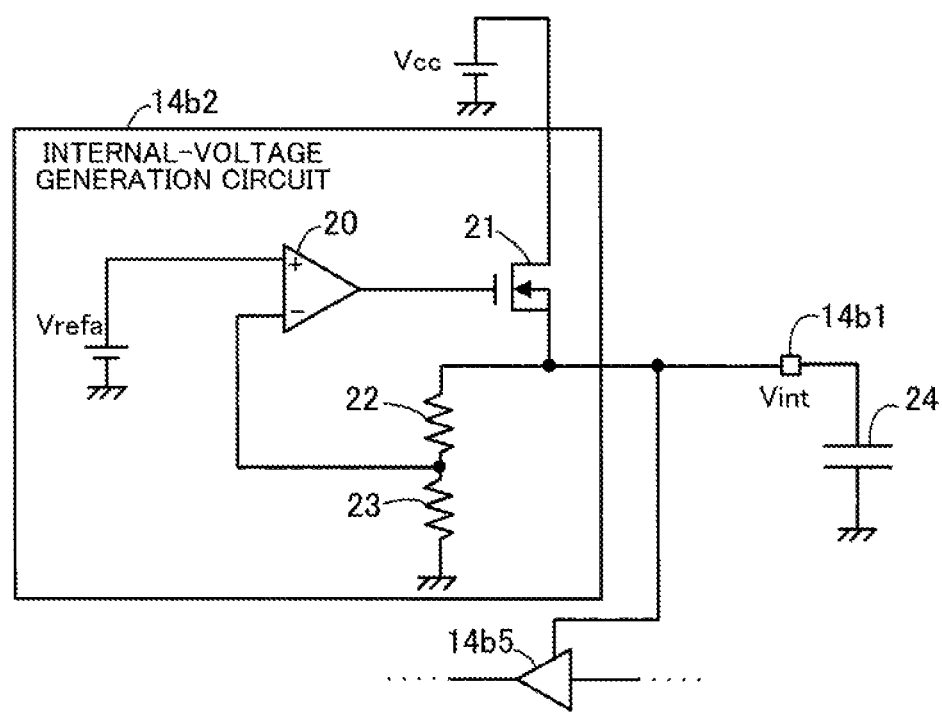
FIG. 2 illustrates one example of an internal-voltage generation circuit, and a portion to which an output terminal of the internal-voltage generation circuit is connected.

FIG. 2 illustrates one example of the internal-voltage generation circuit, and a portion to which the output terminal of the internal-voltage generation circuit is connected.

In FIG. 2, the voltage produced by the diode 14d, the resistance element 14e, and the capacitor 14f illustrated in FIG. 1 is denoted by a symbol Vcc.

The internal-voltage generation circuit 14b2 includes a differential amplifier 20, a transistor 21, and resistance elements 22 and 23.

The non-inverting input terminal of the differential amplifier 20 is applied with a reference voltage Vrefa, and the inverting input terminal of the differential amplifier 20 is connected to a node between the resistance elements 22 and 23 connected in series with each other. The output terminal of the differential amplifier 20 is connected to the gate terminal of the transistor 21.

The transistor 21 is an n-channel MOSFET, and the drain terminal of the transistor 21 is applied with the voltage Vcc. The source terminal (corresponding to the output terminal of the internal-voltage generation circuit 14b2) of the transistor 21 is connected to the terminal 14b1, one end of the resistance element 22, and the amplifier 14b5.

The other end of the resistance element 22 is connected to the inverting input terminal of the differential amplifier 20, and one end of the resistance element 23. The other end of the resistance element 23 is connected to GND.

In FIG. 2, the terminal 14b1 is connected to a capacitor 24.

In the internal-voltage generation circuit 14b2, the voltage Vint is expressed by the following equation (1);

$$V\text{int} = Va + Vb \tag{1}$$

where Va is a voltage applied across the resistance element 22, and Vb is a voltage applied across the resistance element 23.

The voltage Vb is expressed by the following expression (2):

$$Vb = \beta V\text{int} \tag{2}$$

where $\beta = R2/(R1+R2)$, R1 a resistance value of the resistance element 22, and R2 is resistance value of the resistance element 23.

Here, a voltage (input voltage) e between the inverting input terminal and the non-inverting input terminal of the differential amplifier 20 is expressed by the following expression (3), by using the expression (2).

$$e = Vrefa - Vb = Vrefa - \beta Vint \quad (3)$$

In addition, a gate voltage Vg of the transistor 21 is expressed by using the expression (3), as the following expression (4):

$$Vg = A \cdot e = A(Vrefa - \beta Vint) \quad (4)$$

where A is a gain of the differential amplifier 20.

If a mutual conductance gm of the transistor 21 is sufficiently large (for example, gm=10), and if R1+R2 is also sufficiently large for example, R1+R2≥100 kΩ), the gate voltage Vg of the transistor 21 becomes equal to the volts Vint. This is because the circuit constituted by the transistor 21 and the resistance elements 22 and 23 is a source follower circuit. Thus, the gate voltage Vg is expressed by the following expression (5).

$$Vg = A(Vrefa - \beta Vint) = Vint \quad (5)$$

Thus, the voltage Vint is expressed by the following expression (6), by using the expression (5).

$$Vint = A \cdot Vrefa/(1 + A\beta) \quad (6)$$

If the gain A of the differential amplifier 20 is set so that Aβ is sufficiently larger than 1, the expression (6) is approximated as the following expression (7).

$$Vint \approx Vrefa/\beta \quad (7)$$

In the secondary control IC 14b, the resistance values R1 and R2 of the resistance elements 22 and 23 of the internal-voltage generation circuit 14b2, and the reference voltage Vrefa are often set so that the voltage Vint becomes 7 V for driving a power Si-MOSFET. This is because a threshold voltage of the power Si-MOSFET (i.e. a voltage between the gate and the source obtained when the current starts to flow from the drain to the source) is often set at 3 V or more in the switching power supply apparatus, and because the withstand voltage of the gate is about 10 V.

In a case where the reference voltage Vrefa is 1.25 V and the voltage Vint is to be set at 7 V, the resistance values R1 and R2 are determined by using the expression (7), so as to satisfy β=1.25/7≈0.18.

Thus, in the case of the circuit configuration illustrated in FIG. 2, the voltage Vint is always kept at 7 V by setting the gain A and β as described above, as long as the voltage Vcc has a value which allows the drain current to flow in the transistor 21.

The voltage Vint is applied to the amplifier 14b5. Thus the voltage Vint is the maximum value of the gate voltage Vg2, which is applied to the gate terminal of the transistor 14a illustrated in FIG. 1.

However, since the withstand voltage of the gate of an FET, such as a GaN-HEMT, having a wide bandgap semiconductor is about 5 to 6 V, and thus is lower than that of the power Si-MOSFET, the voltage of 7 V fails to be directly applied to the gate terminal of the FET.

Figure 3:
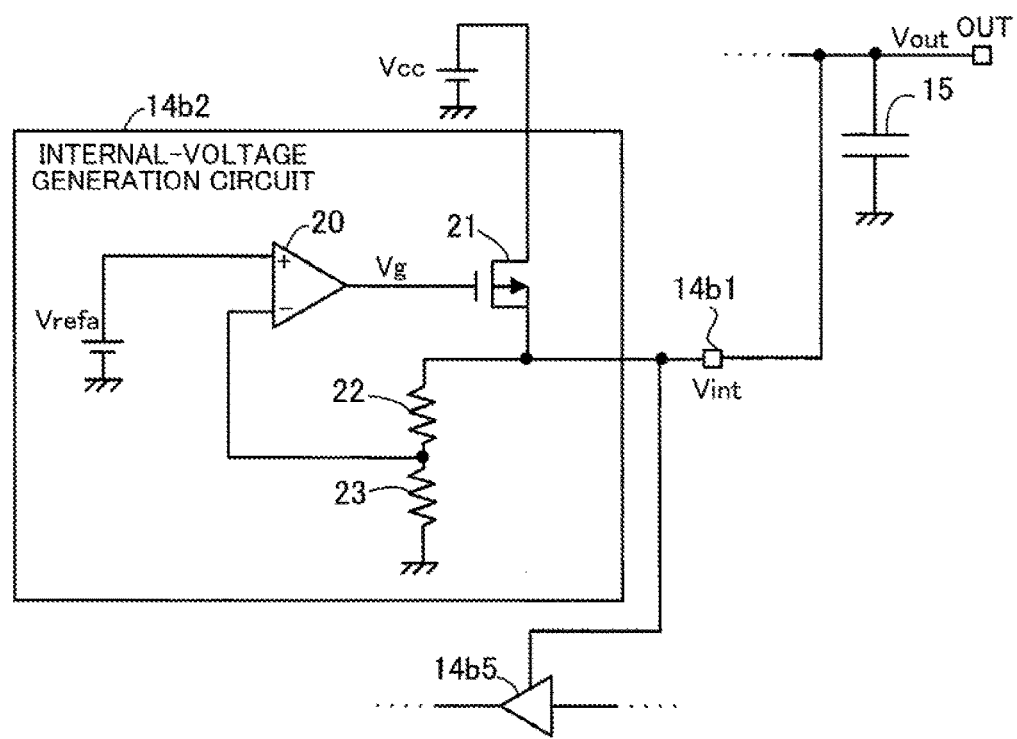
FIG. 3 illustrates a portion to which the output terminal of the internal-voltage generation circuit of the synchronous rectifier circuit of the first embodiment is connected.

Portion to Which Output Terminal of Internal-Voltage Generation Circuit of Synchronous Rectifier Circuit of First Embodiment is Connected FIG. 3 illustrates a portion to which the output terminal of the internal-voltage generation circuit of the synchronous rectifier circuit of the first embodiment is connected.

The output terminal of the internal-voltage generation circuit 14b2 is connected to the output terminal OUT via the terminal 14b1 of the secondary control IC 14b. Thus, the voltage Vint of the terminal 14b1 becomes equal to the output voltage Vout, which is a direct-current voltage obtained through the synchronous rectification. The output voltage Vout is also applied to the series circuit constituted by the resistance elements 29 and 23 of the internal-voltage generation circuit 14b2. When the resistance values R1 and R2 of the resist elements 22 and 23 are set so that the voltage Vint becomes 7 V, and when the output voltage Vout of the switching power supply apparatus 10 is 5 V, the differential amplifier 20 increases the gate voltage Vg so that the voltage Vint is kept at 7 V. However, since the terminal 14b1 is connected to the output terminal OUT of the switching power supply apparatus 10, the voltage Vint is always kept at 5 V.

Thus, the maximum value of the gate voltage Vg2, which is applied to the gate terminal of the transistor 14a illustrated in FIG. 1, is also 5 V.

When the output voltage Vout is equal to or larger than the threshold voltage of the transistor 14a, and is equal to or smaller than the withstand voltage of the gate of the transistor 14a, the transistor 14a is (safely) driven by only adding a line which directly connects the output terminal OUT and the terminal 14b1, to the circuit of FIG. 2.

That is, even when the secondary control IC 14b including the internal-voltage generation circuit 14b2 is used, and the circuit parameters of the internal-voltage generation circuit 14b2 have been adjusted so as to generate an internal voltage which exceeds the withstand voltage of the gate of the low withstand-voltage-of-gate transistor 14a, the increase in the number of components is suppressed.

In a case where the output voltage Vout exceeds the withstand voltage of the gate of the transistor 14a, a voltage-dividing circuit to divide the output voltage Vout may be provided so that the terminal 14b1 is applied with a direct-current voltage which is equal or larger than the threshold voltage of the transistor 14a, and equal to or smaller than the withstand voltage of the gate of the transistor 14a. Also in this case, the increase in the number of components is suppressed, compared to a case where a driver dedicated to the wide bandgap semiconductor device, a power supply for the driver, and components for allowing the driver to reliably operate are added. An embodiment in which the voltage-dividing circuit is provided will be described later.

If the increase in the number of components is suppressed, the increase in cost is also suppressed, and the switching power supply apparatus 10 is downsized.

In addition, the use of the secondary control IC 14b, which is used to drive the power Si-MOSFET, eliminates the need to develop any new control IC used to drive the FET, which has a withstand-voltage-of-gate smaller than that of the power Si-MOSFET.

Here, chargers used for smartphones and tablet terminal devices and conforming the universal serial bus standards (USB) have an output voltage of about 5 V. The output voltage of about 5 V is equal to or larger than the threshold voltage of the low withstand-voltage-of-gate transistor, such as GaN-HEMT, and is equal to or smaller than the withstand voltage the same. Thus, the switching power supply apparatus 10 is suitable for such chargers.

Simulation Result

Hereinafter, examples of simulation result will be described for a case (as illustrated in FIGS. 1 and 3) where the terminal 14b1 of the secondary control IC 14b is connected to the output terminal OUT, and for a case (as illustrated in FIG. 2) where the terminal 14b1 is not connected to the output terminal OUT. The examples of simulation result indicate how each voltage changed with time.

As simulation conditions, the following conditions were used.

The switching power supply apparatus 10 used was a DC/DC converter, and the input voltage (direct-current voltage) Vin of the switching power supply apparatus 10 was 40 V. The primary control IC 11 turned on or off the transistor 12 at a duty ratio of 50%. The inductance of the primary winding 13a of the transformer 13 was 100 µH, and the inductance of the secondary winding 13b was 2 µH. In addition, the turns ratio of the primary winding 13a to the secondary winding 13b was adjusted so that the output voltage Vout becomes 5 V. The resistance value of the resistance element 14e was 10 Ω; the capacitance value of the capacitor 14f was 10 µF; and the capacitance value of the capacitor 15 was 100 µF. The on-voltage of the diodes 14c and 14d was 1 V. The reference voltage Vrefa of the internal-voltage generation circuit 14b2 was 1.25 V; the resistance value of the resistance element 22 was 575 Ω; the resistance value of the resistance element 23 was 125 Ω; and the capacitance value of the capacitor 24 was 4.7 µF. The load resistance of a load (not illustrated) connected to the output terminal OUT was 1 Ω. The description for the other conditions will be omitted.

Figure 4:
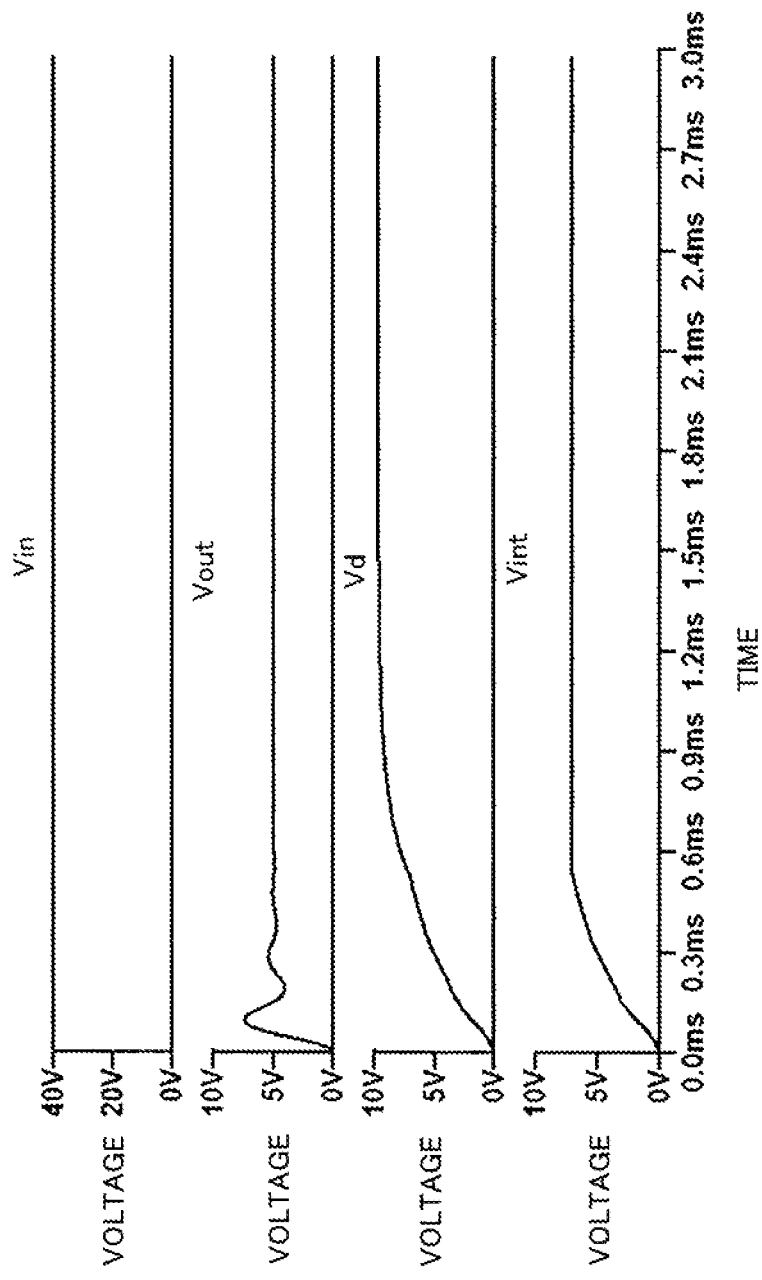
FIG. 4 illustrates one example of simulation result in a case where a terminal of a secondary control IC is not connected to an output terminal of the switching power supply apparatus.

FIG. 4 illustrates one example of simulation result in the case where the terminal of the secondary control IC is not connected to the output terminal of the switching power supply apparatus.

From the top of FIG. 4, wave forms of the input voltage Vin, the output voltage Vout, the drain voltage Vd of the transistor 21, and the voltage Vint of the terminal 14b1 are illustrated. The horizontal axis represents the time, and the vertical axis represents the voltage.

When the input voltage Vin rises from 0 V to 40 V, the output voltage Vout converges to 5 V. In addition, the drain voltage Vd converges to 10 V, and the voltage Vint converges to 7 V because of the above-described function of the internal-voltage generation circuit 14b2.

The reason why the drain voltage Vd (corresponding to the voltage Vcc in FIG. 2) converges to 10 V is as follows.

When the output. voltage Vout is 5 V, one end of the secondary winding 13b which is connected to the diode 14c has an average voltage of 5 V. Hereinafter, this voltage is referred to as a voltage VL2. The H-level period and the L-level period of the voltage VL2 are equal to each other, because the transistor 12 is turned on or off at a duty ratio of 50% by the, primary control IC 11. If the H-level voltage of the voltage VL2 is represented by VH, the L-level voltage of the voltage VL2 is represented by VL, and the on-voltage of the diode 14c is represented by VF, the equation (VH+VL)×0.5=(VH−VF)×0.5=5 V holds. If the on-voltage VF is 1 V, then (VH−1)×0.5=5 V, and thus VH=11 V.

When the voltage VL2 is rectified by the diode 14d whose on-voltage is 1 V, the resistance element 14e, and the capacitor 14f, the rectified voltage converges to VH−1=10 V. For this reason, the drain voltage Vd converges to 10 V.

Figure 5:
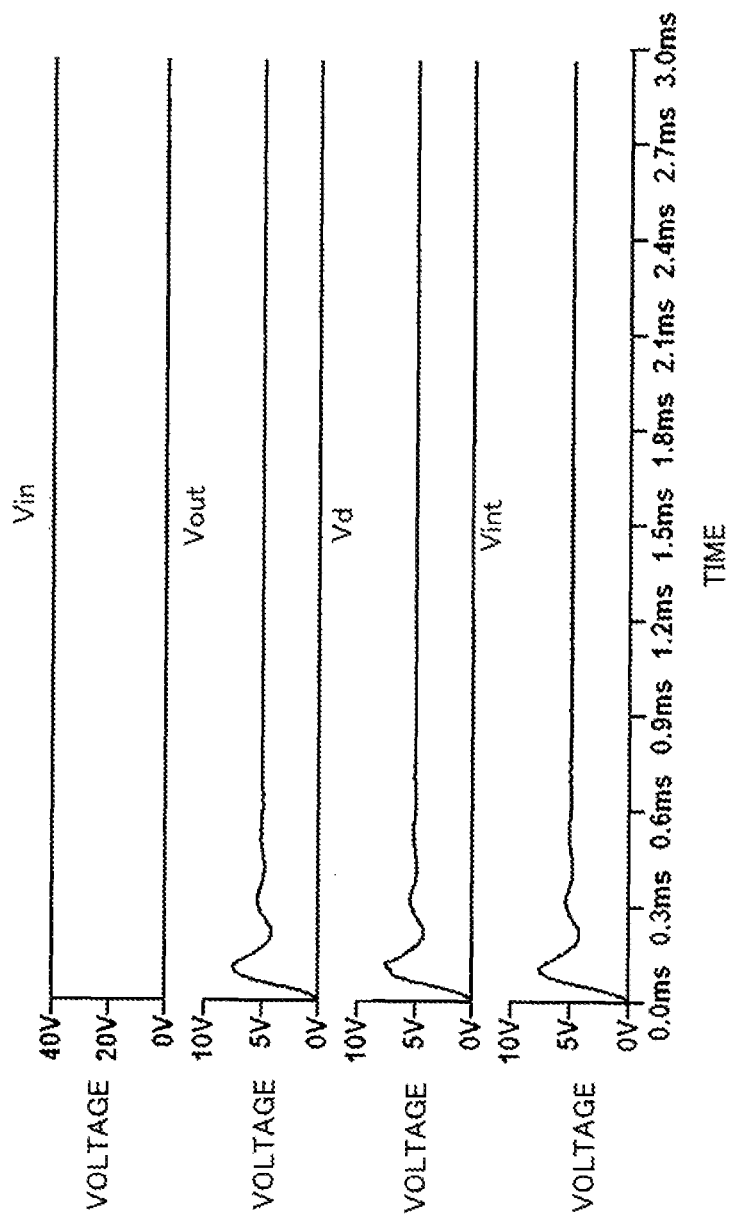
FIG. 5 illustrates one example of simulation result in case where the terminal of the secondary control IC is connected to the output terminal of the switching power supply apparatus.

FIG. 5 illustrates one example of simulation result in the case where the terminal of the secondary control IC is connected to the output terminal of the switching power supply apparatus.

From the top of FIG. 5, wave forms of the input voltage Vin, the output voltage Vout, the drain voltage Vd of the transistor 21, and the voltage Vint of the terminal 14b1 are illustrated. The horizontal axis represents the time, and the vertical axis represents the voltage.

When the input voltage Vin rises from 0 V to 40 V, the output voltage Vout converges to 5 V. In addition, the drain voltage Vd converges to 5 V; and the voltage Vint also converges to 5 V like the output voltage Vout, because the terminal 14b1 is connected to the output terminal OUT.

The reason why the drain voltage Vd converges to not 10 V but 5 V when the terminal 14b1 is connected to the output terminal OUT is as follows.

When the terminal 14b1 is connected to the output terminal OUT, the voltage Vint becomes smaller than the voltage Vint obtained when the terminal 14b1 is not connected to the output terminal OUT. Thus, the voltage between the gate and the source of the transistor 21 increases a value by which the voltage Vint has decreased, compared to the case where the terminal 14b1 is not connected to the output terminal OUT. As a result, the drain current of the transistor 21 increases. When the load resistance of a load connected to the output terminal OUT is 1 Ω, the load resistance is sufficiently smaller than the resistance values of the resistance elements 22 and 23 of the internal-voltage generation circuit 14b2 illustrated in FIG. 3. Thus, most of the drain current of the transistor 21 flows to the load. In addition, if the output voltage Vout is kept at 5 V, the output terminal OUT is regarded as a terminal connected to a direct-current power supply (battery) which outputs a voltage of 5 V. In this time, a path on the output terminal OUT side opposite to the drain terminal of the transistor 21 has a resistance value of substantially 0 Ω. Thus, the drain voltage Vd becomes 5 V, as is the output voltage Vout.

Second Embodiment

Figure 6:
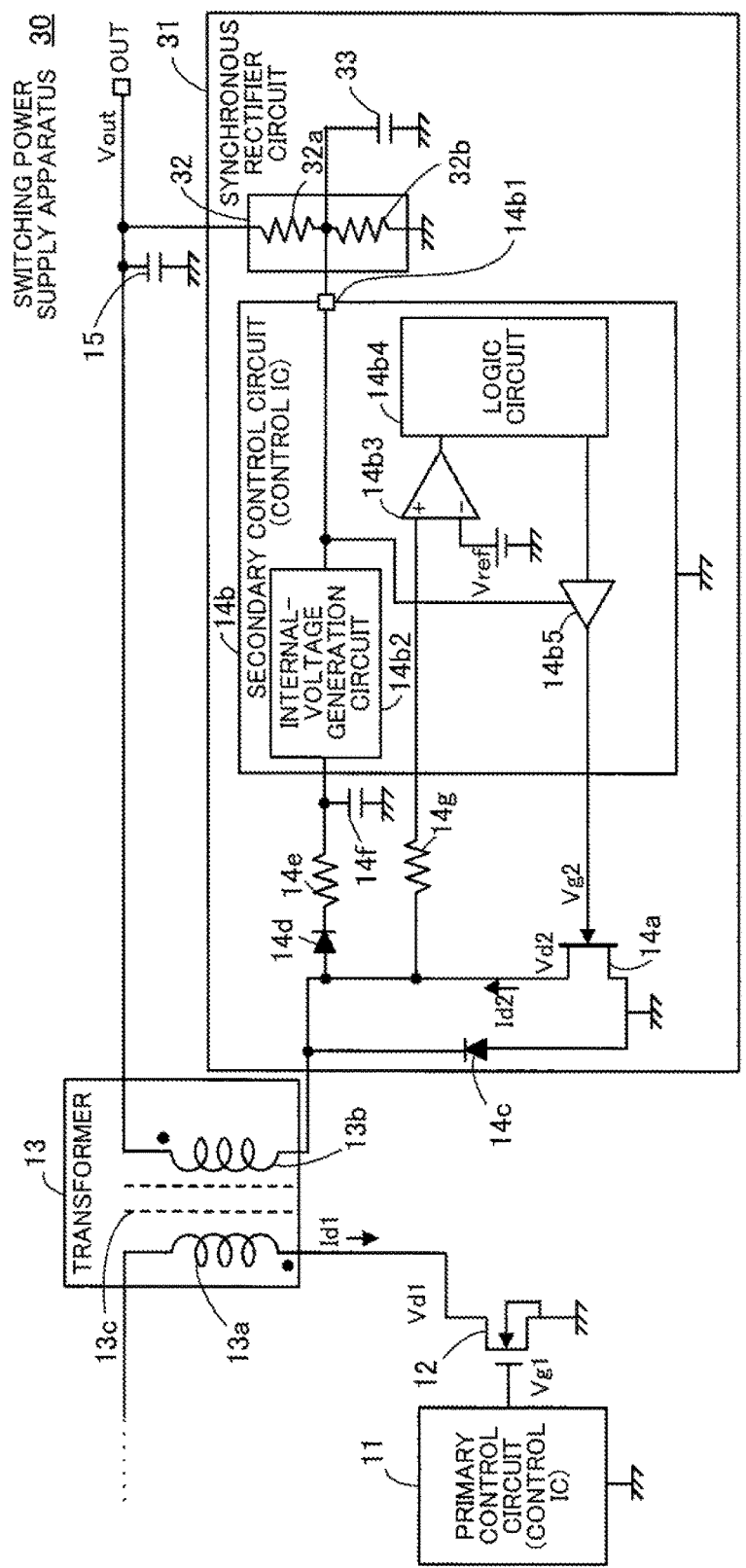
FIG. 6 illustrates one example of a switching power supply apparatus and a synchronous rectifier circuit of a second embodiment.

FIG. 6 illustrates one example of a switching power supply apparatus and a synchronous rectifier circuit of a second embodiment. In FIG. 6, the same component as that illustrated in FIG. 1 is given the same symbol.

A synchronous rectifier circuit 31 of a switching power supply apparatus 30 further includes a voltage-dividing circuit 32 having resistance elements 32a and 32b, and a capacitor 33.

The voltage-dividing circuit 32 is connected between the output terminal OUT and GND, and applies a voltage obtained by dividing the output voltage Vout, to the terminal 14b1 of the secondary control IC 14b.

The capacitor 33 stores electric charge to be supplied to the gate terminal of the transistor 14a. One end of the capacitor 33 is connected to the node between the resistance elements 32a and 32b of the voltage-dividing circuit 32, and the other end of the capacitor 33 is connected to GND.

The switching power supply apparatus 30 configured in his manner is used in a case where the output voltage Vout exceeds the withstand voltage of the gate of the transistor 14a. The resistance values of the resistance elements 32a and 32b of the voltage-dividing circuit 32 are determined so that the voltage obtained by dividing the output voltage Vout becomes equal to or larger than the threshold voltage of the transistor 14a and equal to or smaller than the withstand voltage of the gate of the transistor 14a.

Since the synchronous rectifier circuit 31 includes the voltage-dividing circuit 32, the switching power supply apparatus 30 may drive the low withstand-voltage-of-gate transistor 14a even when the output voltage Vout exceeds the withstand voltage of the gate of the transistor 14a. In addition, the same effect as that by the switching power supply apparatus 10 of the first embodiment is produced with less additional components.

Third Embodiment

Figure 7:
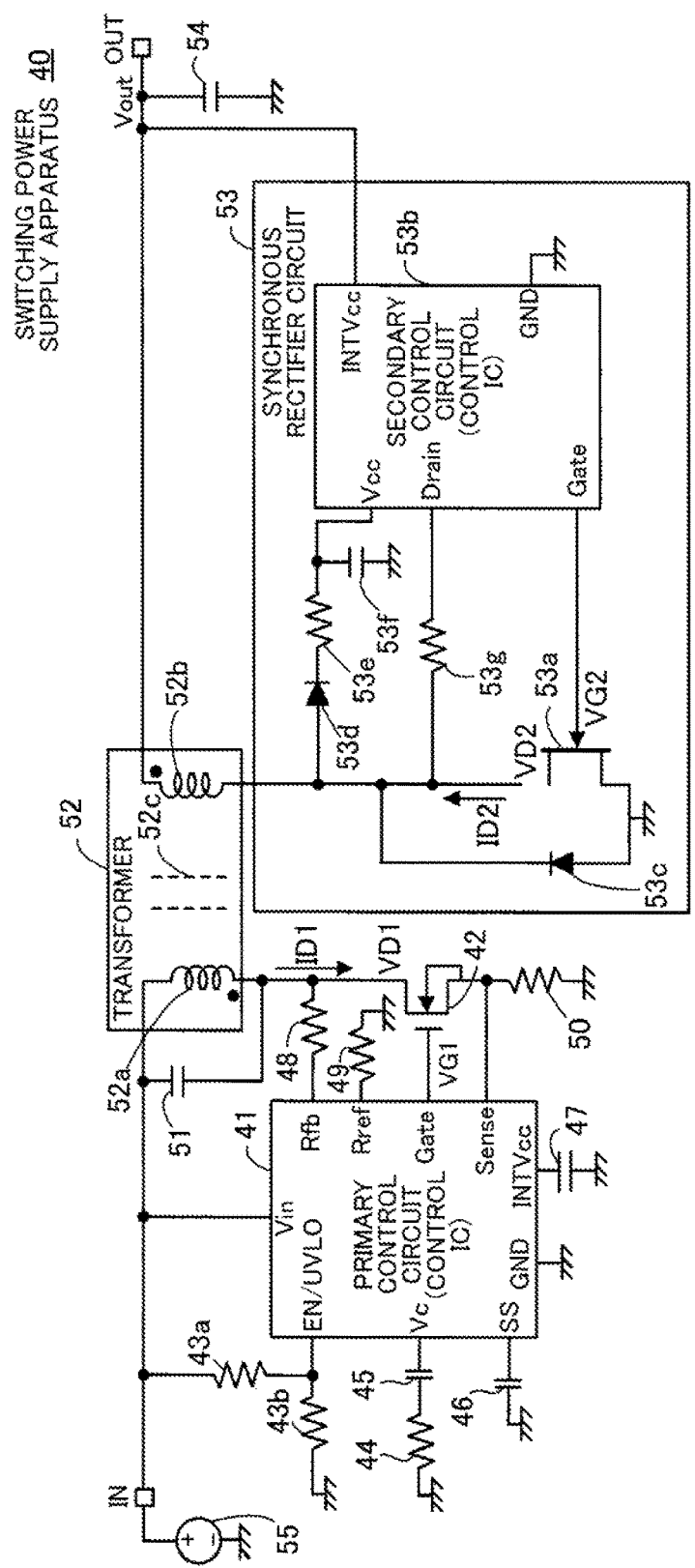
FIG. 7 illustrates one example of a switching power supply apparatus and a synchronous rectifier circuit of a third embodiment.

FIG. 7 illustrates one example of a switching power supply apparatus and a synchronous rectifier circuit of a third embodiment.

A switching power supply apparatus 40 of the third embodiment is a DC/DC converter.

A primary circuit of the switching power supply apparatus 40 includes a primary control IC 41, a transistor 42, resistance elements 43a, 43b, 44, 48, 49, and 50, and capacitors 45, 46, 47, and 51. The switching power supply apparatus 40 includes a transformer 52, which electrically isolates the primary circuit and a secondary circuit from each other, and magnetically couples the primary circuit and the secondary circuit with each other. The secondary circuit includes a synchronous rectifier circuit 53 and a capacitor 54.

Hereinafter, the description will be made for a case where the transistor 42 is an n-channel FET. Examples of the FET include a Si-MOSFET, a GaN-HEMT, and an FET having SiC or GaAs.

The primary control IC 41 outputs a gate voltage VG1, which turns on or off the transistor 42 at a predetermined switching frequency and duty ratio.

The primary control IC 41 used may be an LT (registered trademark) 3748 manufactured by Linear Technology Corporation, but may be another component as long as the component has the same function. The primary control IC 41 has a plurality of terminals denoted by "EN/UVLO", "Vc", "SS", "Vin", "Rfb", "Rref", "Gate", "Sense", "INTVcc", and "GND".

The terminal "EN/UVLO" is connected to one end of the resistance element 43a and one end of the resistance element 43b. The resistance elements 43a and 43b are used to supply a determination voltage, which is used to determine whether to operate the primary control IC 41, to the primary control IC 41. The other end of the resistance element 43a is connected to an input terminal IN of the switching power supply apparatus 40, and the other end of the resistance element 43b is connected to GND.

The terminal "VC" is connected to a series circuit constituted by the resistance element 44 and the capacitor 45. The series circuit is used to adjust a response speed of a difference voltage between the drain voltage VD1 of the transistor 42 and an internal reference voltage. The drain voltage VD1 is supplied to the primary control IC 41, as a feedback voltage. One end of the resistance element 44 is connected to GND, and the other end of the resistance element 44 is connected to one end of the capacitor 45. The other end of the capacitor 45 is connected to the terminal "Vc".

The terminal "SS" is connected to one end of the capacitor 46. The capacitor 46 controls the increase of the output voltage of the output terminal OUT when the input voltage is applied to the input terminal IN. The other end of the capacitor 46 is connected to GND.

The terminal "Vin" is connected the input terminal IN.

The terminal "INTVcc" is connected to one end of the capacitor 47, which supplies electric charge to the transistor 42. The other end of the capacitor 47 is connected to GND.

The terminal "Rfb" is connected to one end of the resistance element 48 used to detect the drain voltage VD1. The other end of the resistance element 48 is connected to the drain terminal of the transistor 42. The primary control IC 41 detects the drain voltage VD1 as a feedback voltage, and adjusts the duty ratio into an appropriate value, depending or the drain voltage VD1, to keep the constant output voltage of the switching power supply apparatus 40.

The terminal "Rref" is connected to one end of the resistance element 49, which produces the internal reference voltage used to determine the switching frequency. The other end of the resistance element 49 is connected to GND.

The terminal "Gate" is connected to the gate terminal of the transistor 42.

The terminal "Sense" is connected to the source terminal of the transistor 42 and one end of the resistance element 50, and is used to monitor the current which flows through the source terminal of the transistor 42. The other end of the resistance element 50 is connected to GND. For example, when the primary control IC 41 detects a current having an abnormal value, the primary control IC 41 stops the switching operation of the transistor 42.

The terminal "GND" is connected to GND.

The transistor 42 has the drain terminal connected to a primary winding 52a of the transformer 52, the source terminal connected to GND via the resistance element 50, and the gate terminal connected to the primary control IC 41. The transistor 42 turns on or off in accordance with the gate voltage VG1 supplied from the primary control IC 41.

The capacitor 51 is connected to both ends of the primary winding 52a of the transformer 52. The capacitor 51 absorbs energy of surge voltage which is produced across the primary winding 52a during the switching operation. The capacitor 51 may be omitted.

The transformer 52 has the primary winding 52a, a secondary winding 52b, and a core 52c. Although schematically illustrated in FIG. 7, the primary winding 52a and the secondary winding 52b are wound around the core 52c. Here, a black dot illustrated in the vicinity of one end of the primary winding 52a indicates a position from the primary winding 52a is wound, and another black dot illustrated in the vicinity of one and of the secondary winding 52b indicates a position from which the secondary winding 52b is wound.

The other end of the primary winding 52a is connected to the input terminal IN. The one end of the secondary winding 52b is connected to one end the capacitor 54, and to an output terminal OUT of the switching power supply apparatus 40. The other end of the secondary winding 52b is connected to the synchronous rectifier circuit 53.

The synchronous rectifier circuit 53 includes a transistor 53a, a secondary control IC 53b, diodes 53c and 53d, resistance elements 53e and 53g, and a capacitor 53f. As is the transistor 42, the transistor 53a is an n-channel FET which is a low withstand-voltage-of-gate transistor, such as a GaN-HEMT or an FET having SiC or GaAs.

The transistor 53a has the drain terminal connected to the other end of the secondary winding 52b, the source terminal connected to GND, and the gate terminal applied with the gate voltage VG2 supplied from the secondary control IC 53b. The transistor 53a performs its switching operation in accordance with the gate voltage VG2.

The secondary control IC 53b the same components as those of the secondary control IC 14b as illustrated in FIG. 1, but those components are omitted in FIG. 7. An internal-voltage generation circuit (not illustrated) of the secondary control IC 53b has parameters which have been adjusted so as to generate an internal voltage larger than the withstand voltage of the gate of the transistor 53a.

The secondary control IC 53b outputs the gate voltage VG2 to control the switching operation of the transistor 53a, depending on the drain voltage VD2 of the transistor 53a.

The secondary control IC 53b used may be an LT 8309 manufactured by Linear Technology Corporation, but may be another component as long as the component has the same function. The secondary control IC 53b includes a plurality of terminals denoted by "Vcc", "Drain", "Gate", "INTVcc", and "GND".

The terminal "Vcc" is supplied with a power supply voltage produced by the diode 53d, the resistance element 53e, and the capacitor 53f. The secondary control IC 53b operates with the power supply voltage.

The terminal "Dain" is connected to the other end of the secondary winding 52b and the drain terminal of the transistor 53a, via the resistance element 53g disposed to detect the drain voltage VD2 of the transistor 53a.

The terminal "Gate" is connected to the gate terminal of the transistor 53a. The gate voltage VG2 is outputted from the terminal "Gate".

The terminal "INTVcc" is an external terminal to which a capacitor (i.e. the capacitor 54 in the example of FIG. 7) is connected. The capacitor 54 stores electric charge to be supplied to the transistor 53a. The terminal "INTVcc" corresponds to the terminal 14b1 the secondary control IC 14b of the first embodiment, and is directly connected to the output terminal OUT of the switching power supply apparatus 40, as is the terminal 14b1.

The terminal "GNU" is connected to GND.

The diode 53c performs rectification until when the synchronous rectification by the switching operation of the transistor 53a is started. The anode of the diode 53c is connected to the source terminal of the transistor 53a, and the cathode of the diode 53c is connected to the drain terminal of the transistor 53a.

The diode 53d, the resistance element 53e, and the capacitor 53f produce a power supply voltage, which is a direct-current voltage to operate the secondary control IC 53b.

The anode of the diode 53d is connected to the other end of the secondary winding 52b, and the cathode of the diode 53d is connected to one end of the resistance element 53e. The other end of the resistance element 53e is connected to one end of the capacitor 53f, and to the terminal "Vcc", which is one of the terminals of the secondary control IC 53b. The other end of the capacitor 53f is connected to GND.

The capacitor 54 of the switching power supply apparatus 40 is disposed to reduce ripple voltage. In addition, the capacitor 54 stores electric charge to be supplied to the gate terminal of the transistor 53a. One end of the capacitor 54 is connected to the secondary winding 52b, the output terminal OUT, and the terminal "INTVcc" of the secondary control IC 53b; and the other end of the capacitor 54 is connected to GND.

Here, since the switching power supply apparatus 40 is a DC/DO converter, the input terminal IN is connected to a DC power supply 55.

Hereinafter, the operation of the switching power supply apparatus 40, which serves as a DC/DC converter, will be described.

When the gate voltage VG1 outputted from the primary control IC 41 rises from the L level to the H level, the transistor 42 turns on, the drain current ID1 flows in a direction from the drain terminal to the source terminal, and the transformer 52 stores magnetic energy. When the gate voltage VG1 falls from the H level to the L level, the transistor 42 turns off, and the drain current ID1 becomes 0 A. When the transistor 42 turns off, the magnetic energy stored in the transformer 52 causes the drain current ID2 to flow, via the diode 53c, in a direction from the drain terminal of the transistor 53a to the cathode of the diode 53c. In this time, the drain voltage VD2 is changed into a negative value. When the secondary control IC 53b detects this change, the secondary control IC 53b raises the gate voltage VG2 from the L level to the H level. With this operation, the transistor 53a is turned on. At this time, the value of the H level is equal to the output voltage Vout of the switching power supply apparatus 40.

When the magnetic energy stored in the transformer 52 decreases, the drain current ID2 also decreases, increasing the drain voltage VD2. When the drain voltage VD2 exceeds a predetermined reference voltage, the secondary control IC 53b lowers the gate voltage VG2 from the H level to the L level. With this operation, the transistor 53a is turned off. These operations are repeated; and the output voltage Vout, which is a direct-current voltage, is outputted from the output terminal OUT.

Simulation Result

Hereinafter, an example of simulation result for the operation of the switching power supply apparatus 40 of the third embodiment will be described.

As simulation conditions, the following conditions were used.

The DC power supply 55 output ted a direct-current voltage of 48 V. The inductance of the primary winding 52a of the transformer 52. was 28.5 µH. The inductance of the secondary winding 52b of the transformer 52 was 0.8 µH. The resistance value of the resistance element 43a was 412 kΩ. The resistance value of the resistance element 43b was 15.4 kΩ. The resistance value of the resistance element 44 was 12.1 kΩ. The capacitance value of the capacitor 45 was 1500 pF. The capacitance value of the capacitor 46 was 0.005 µF. The capacitance value of the capacitor 47 was 4.7 µF. The resistance value of the resistance element 48 was 147 kΩ. The resistance value of the resistance element 49 was 6.04 kΩ. The resistance value of the resistance element 50 was 6 mΩ. The capacitance value of the capacitor 51 was 1 fF. The resistance value of the resistance element 53e was 10 Ω. The capacitance value of the capacitor 53f was 1 µF. The resistance value of the resistance element 53g was 2.3 kΩ. The capacitance value of the capacitor 54 was 330 µF. The description for the other conditions will be omitted.

Figure 8:
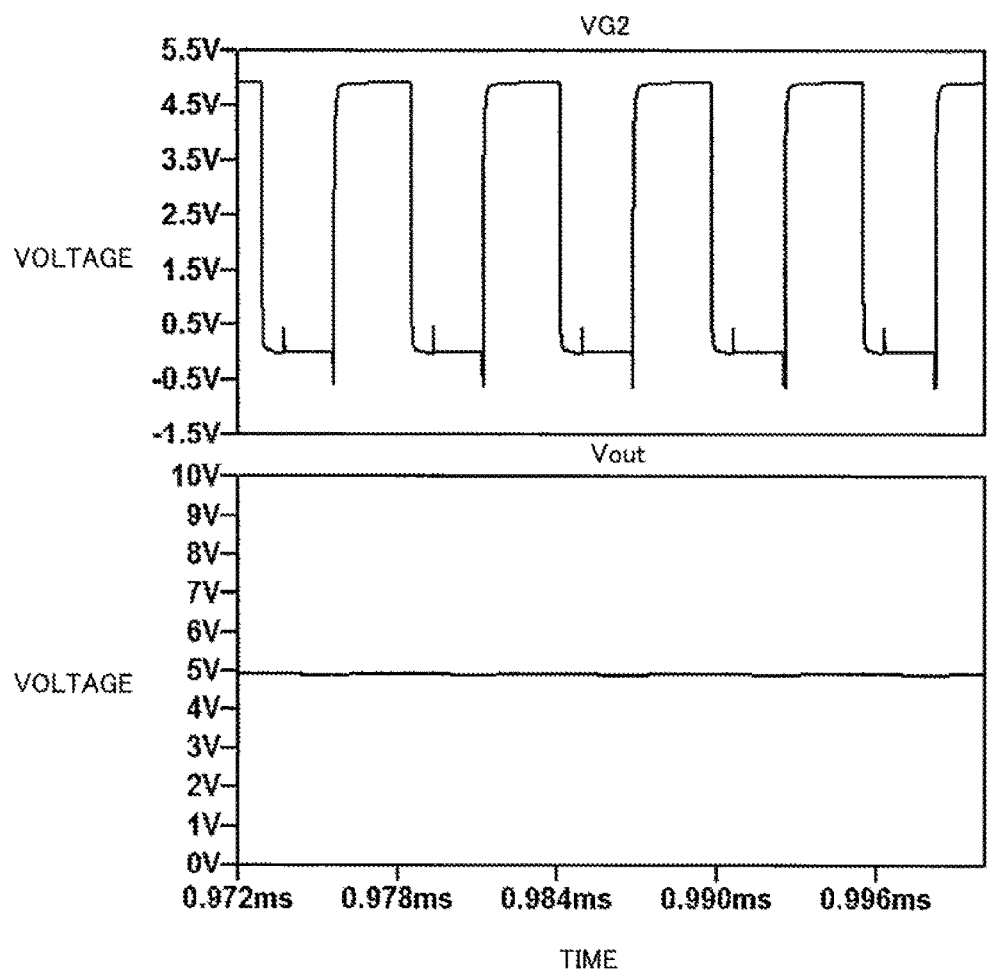
FIG. 8 illustrates one example of simulation result for operation.

FIG. 8 illustrates one example of simulation result for the operation.

FIG. 8 illustrates waveforms of the output voltage Vout and the gate voltage VG2 Of the transistor 53a, obtained through the simulation for the operation of the switching power supply apparatus 40 in a state where the output terminal OUT is connected to a load having a load resistance of 1 Ω. The horizontal axis represents the time, and the vertical axis represents the voltage.

As illustrated in FIG. 8, the output voltage Vout is kept at substantially 5 V. In addition, the maximum value of the gate voltage VG2 does not exceed 5 V.

Figure 9:
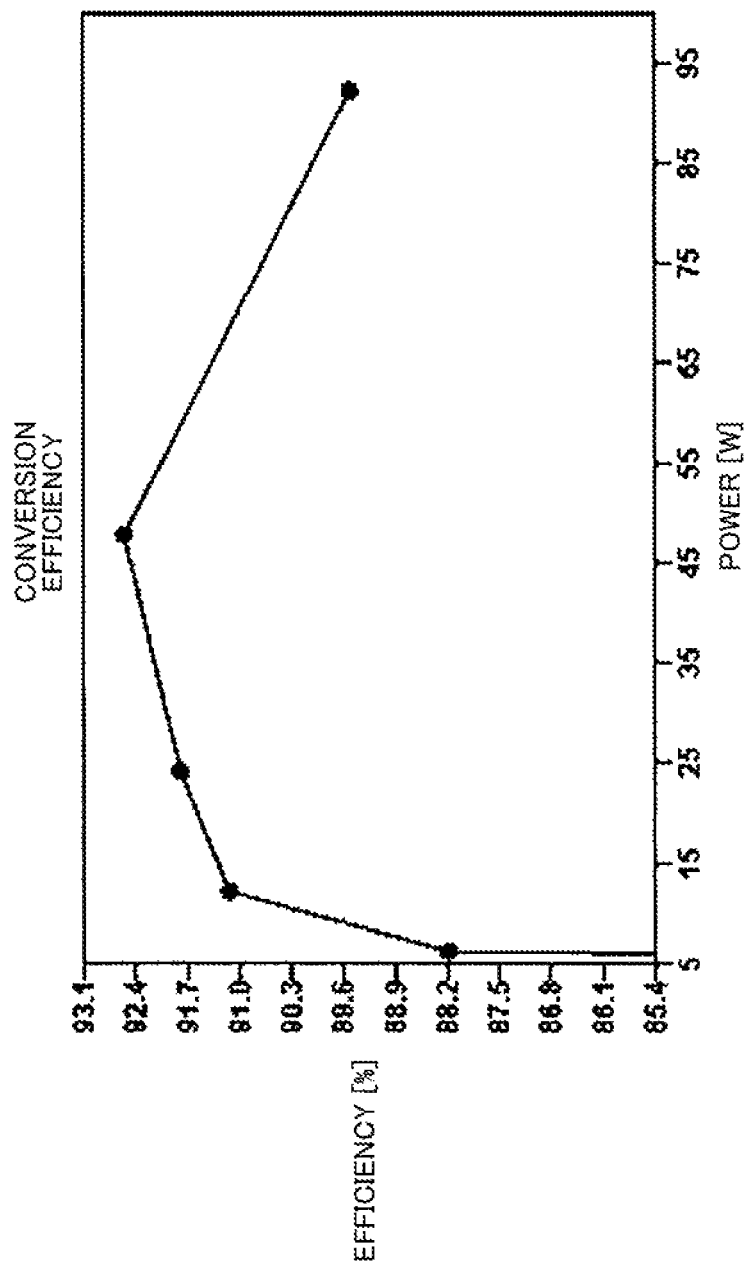
FIG. 9 illustrate s one example of calculation result for conversion efficiency.

FIG. 9 illustrates one example of calculation result for conversion efficiency. The horizontal axis represents electric power [W], and the vertical axis represents the efficiency [%].

In FIG. 9, there is illustrated the calculation result for conversion efficiency obtained when the electric power across the load is changed by changing the load resistance of the load. As illustrated in FIG. 9, the peak value of the conversion efficiency exceeds 90%.

As described above, in the switching power supply apparatus 40 of the third embodiment, the transistor 53a is driven with voltage within the withstand voltage of the gate, by only connecting the output terminal OUT of the switching power supply apparatus 40 to the terminal "INTVcc" of the secondary control IC 53b.

Thus, even when the secondary control IC 53b including the internal-voltage generation circuit is used, and the circuit parameters of the internal-voltage generation circuit have been adjusted so as to generate an internal voltage which exceeds the withstand voltage of the gate of the transistor 53a, the increase in the number of components is suppressed. In addition, the relatively excellent conversion efficiency is obtained, as illustrated in FIG. 9.

Here, the switching power supply apparatus 40 of the third embodiment may also be provided with the voltage-dividing circuit 32, as is the switching power supply apparatus 30 of the second embodiment, for the case where the output voltage Vout exceeds the withstand voltage of the gate of the transistor 53a.

Thus, one aspect of the synchronous rectifier circuit and the switching power supply apparatus has been described with reference to some embodiments. However, the content given above is to be regarded as illustrative examples to which the present embodiments are not limited. For example, the transistors 12 and 14a of FIG. 1, which have been described as n-channel FETs, may be p-channel FETs. In addition, although the switching power supply apparatuses 10, 30, and 40 have been described as isolated switching power supply apparatuses using the transformer 13 or 52, the switching power supply apparatuses 10, 30, and 40 may be non-isolated switching power supply apparatuses which do not use any of the transformers 13 and 52.

In one aspect, the increase in the number or components used to drive a low withstand-voltage-of-gate transistor is suppressed.

All examples and conditional language provided herein are intended for the pedagogical purposes of aiding the reader in understanding the invention and the concepts contributed the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A synchronous rectifier circuit used in a switching power supply apparatus that performs synchronous rectification, the synchronous rectifier circuit comprising:
    a transistor configured to perform switching operation in accordance with a control voltage applied to a first terminal; and
    a control circuit configured to include a second terminal and apply the control voltage to the first terminal, the second terminal being connected to a capacitor which stores electric charge to be supplied to the first terminal and being applied with a first direct-current voltage obtained through synchronous rectification and equal to or smaller than a withstand voltage of a gate of the transistor as well as equal to or larger than a threshold voltage of the transistor, a maximum value of the control voltage being the first direct-current voltage.

2. The synchronous rectifier circuit according to claim 1, wherein the control circuit further includes:
    an internal-voltage generation circuit whose circuit parameters are adjusted so that the internal-voltage generation circuit produces an internal voltage which exceeds the withstand voltage by using a second voltage obtained by rectifying a first voltage applied to a third terminal of the transistor;
    a logic circuit configured to determine whether to turn on or off the transistor, in accordance with a comparison result between the first voltage and a reference voltage; and
    an amplifier configured to generate the control voltage in accordance with an output signal from the logic circuit,
    wherein a first output terminal of the internal-voltage generation circuit is connected to the amplifier and the second terminal, and
    wherein a voltage of the first output terminal is equal to the first direct-current voltage, regardless of the internal voltage.

3. The synchronous rectifier circuit according to claim 1, wherein the second terminal is directly connected to a second output terminal of the switching power supply apparatus.

4. The synchronous rectifier circuit according to claim 1, further comprising:
    a voltage-dividing circuit configured to generate the first direct-current voltage by dividing an output voltage from the switching power supply apparatus, which is obtained through the rectification.

5. A switching power supply apparatus that performs synchronous rectification, the switching power supply apparatus comprising:
    a first transistor configured to perform switching operation in accordance with a first control voltage applied to a first terminal; and
    a synchronous rectifier circuit configured to include a second transistor which turns on or off at a timing different from a timing of the first transistor in accordance with a second control voltage applied to a second terminal, and a control circuit which includes a third terminal and applies the second control voltage to the second terminal, the third terminal being connected to a capacitor which stores electric charge to be supplied to the second terminal and being applied with a first direct-current voltage obtained through synchronous rectification and equal to or smaller than a withstand voltage of a gate of the second transistor as well as equal to or larger than a threshold voltage of the second transistor, a maximum value of the second control voltage being the first direct-current voltage.

* * * * *